Figure 1:
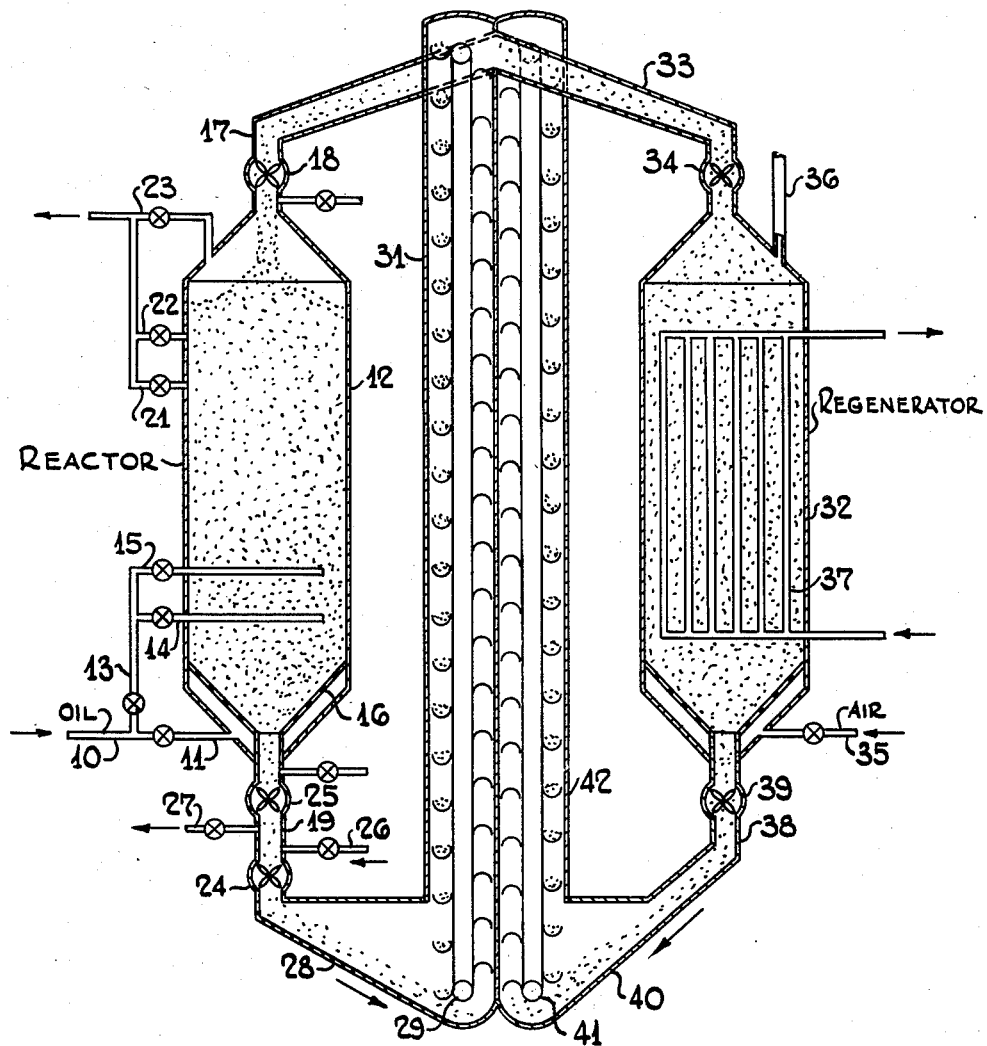

July 10, 1951 — C. E. HEMMINGER — 2,560,343
CATALYTIC CONVERSION PROCESS
Filed June 8, 1944 — 2 Sheets-Sheet 1

Charles E. Hemminger Inventor
By ⟨signature⟩ Attorney

Patented July 10, 1951

2,560,343

UNITED STATES PATENT OFFICE 2,560,343

CATALYTIC CONVERSION PROCESS

Charles E. Hemminger, Westfield, N. J., assignor to Standard Oil Development Company, a corporation of Delaware Application June 8, 1944, Serial No. 539,306

4 Claims. (Cl. 196—52)

1

The invention relates to a method of and apparatus for the conversion of gases or vapors in the presence of a solid catalyst or contact agent in subdivided form and pertains more particularly to a process for the conversion of such vapors or gases in the presence of a moving bed of granular catalyst or other contact agent which is continuously reduced and removed from the conversion zone.

While the invention in some of its broader phases may have a more general application, it is particularly adapted for the catalytic conversion of hydrocarbon oils, and particularly for the cracking of higher boiling oils into motor fuels and other low-boiling constituents.

It has now become common practice to crack hydrocarbon oils in the presence of a solid cracking catalyst such as activated clays and synthetic gels of the same or different chemical composition.

According to one general mode of operation, the oil in vapor form is passed through a cracking chamber containing a moving bed of coarse, granular catalyst which is continuously introduced into the top of the cracking chamber through a suitable seal and is continuously removed from the bottom of the chamber. In order to provide the desired seal it is necessary to maintain the level of the catalyst within the reactor above or at a level with the catalyst inlet conduit. The catalyst removed from the bottom of the reactor is normally transferred by bucket conveyors or other suitable means to the top of a regenerating zone in which the catalyst is regenerated to remove combustible deposits formed during the cracking treatment. To this end, a stream of oxidizing gas is passed upwardly through the regenerating zone and the regenerated catalyst is withdrawn from the bottom of the chamber and returned to the top of the cracking chamber by suitable means, such as bucket conveyors.

When following this general mode of procedure, it is necessary to maintain the cracking chamber substantially full of the granular catalyst in order to maintain the necessary vapor seal at the catalyst inlet, as before mentioned. This means that the amount of catalyst contained in the cracking chamber remains fixed and constant for a chamber of given size. This necessity of maintaining a fixed and constant amount of catalyst within the conversion chamber constitutes an inherent limitation on the type of procedure above described, because in many instances it is desirable to vary the weight space

2 velocity of the reaction, such as the weight of oil treated per hour per weight of catalyst within the reaction chamber. For example, in the catalytic cracking of hydrocarbon oils the activity of the catalyst tends to gradually depreciate despite repeated regeneration. As a result it is desirable to increase the amount of catalyst contained in the reactor as the activity of the catalyst drops off in order to maintain the desired conversion. Since the weight of the catalyst in the chamber remains fixed, it will be seen that the only method of varying the weight space velocity is to change the rate of flow of the vapors or other reactants being treated. This is objectionable in many cases, since it may change the amount and type of product obtained in a given time.

It is particularly objectionable in catalytic cracking, since the composition of the feed does not remain constant but varies with the type and source of oil being treated. Furthermore, it is desirable in many cases to vary the type and yield of products produced by the cracking operation. In order to compensate for changes in the composition of the feed stock and to maintain a more effective control over the yield and character of the end products produced, it is of particular advantage to be able to regulate or control the weight space velocity and time of contact between the oil vapors and the catalyst without changing the rate of flow of the oil.

One of the principal objects of the present invention is to proivde an improved method of and apparatus for more effectively controlling the contact time between vapors and catalyst in processes of the general type above described.

Figure 2:
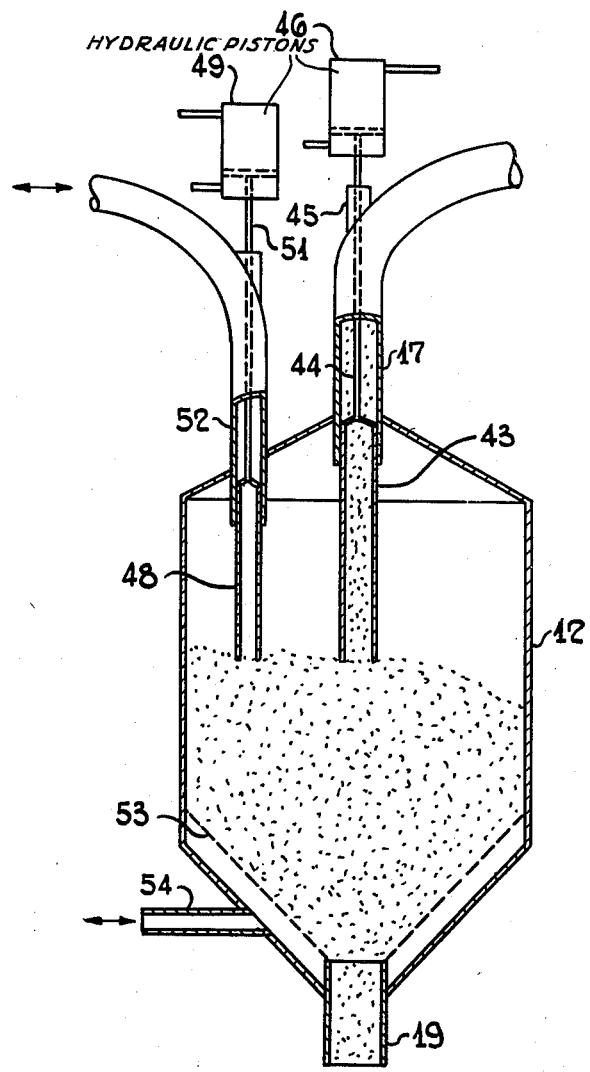

Other more specific objects and advantages will be apparent from the more detailed description hereinafter in which reference will be made to the accompanying drawings wherein:

Fig. 1 is a diagrammatic view in side elevation illustrating the invention as applied to an apparatus for the cracking of hydrocarbon oils, and Fig. 2 is a similar side elevation of a conversion chamber on a somewhat enlarged scale as compared with Fig. 1 showing parts in section of further modifications of the invention.

In accordance with the modification illustrated in Fig. 1, the time of contact of the oil vapors or other reactants passing through the chamber is controlled or regulated by providing a plurality of inlets or outlets, or both, for introducing and removing the reactants from the cracking chamber. These inlets and outlets are located at vertically spaced points longitudinally of the conversion chamber so that the length of path of the reactants passing through the catalyst may be changed as conditions require. In accordance with another modification illustrated in Fig. 2, the amount of catalyst contained in the reactor may be varied without destroying the vapor seal at the catalyst inlet by providing an extensible and retractable inlet conduit for the catalyst. This makes it possible to increase or decrease the depth of catalyst within the reactor, and consequently the time of contact between the reactants and the catalyst.

As a further modification, also illustrated in Fig. 2, an extensible inlet or outlet tube is provided for the reactants. This extensible conduit functions in the same manner as the manifolds illustrated in Fig. 1 for controlling the length of path of the reactants through the conversion chamber.

The invention will now be described in fuller detail as applied to the catalytic cracking of hydrocarbon oils, it being understood that it may also be used for other hydrocarbon reactions and conversions, such as refining, reforming, hydrogenation, dehydrogenation, desulfurization, isomerization, and the like.

Referring to Fig. 1, reference character 10 designates a charge line through which the oil to be processed is introduced into the system. This oil is preferably in vapor form and preheated to the required temperature. The oil introduced through line 10 may be a clean gas oil or it may be a reduced crude or other suitable oil to be converted into lower boiling constituents. The oil passing through line 10 may discharge through line 11 directly into the bottom portion of reactor 12, or it may be passed through lines 13, 14 or 15 into the reactor 12 at spaced points above the bottom of the reactor 12. Pipes 14 and 15 may terminate within the reactor in the form of perforated coils or other suitable means for distributing the oil vapors into the reactor.

The bottom of the reactor 12 may be provided with a false perforated bottom 16 through which the oil introduced through line 11 may be distributed throughout the reactor. The reactor 12 is adapted to be substantially filled with granular cracking catalyst. This catalyst is introduced into the reactor through conduit 17 having a star feeder or other control valve 18 for regulating the amount of catalyst introduced. The catalyst is continuously withdrawn from the bottom of the reactor 12 through conduit 19, as hereinafter described.

The catalyst contained in the reactor 12 may be of any suitable composition capable of having a catalytic effect on the cracking reaction. This catalyst, for example, may comprise activated clays or synthetic gels of silica-alumina, silica-zirconia, silica-magnesia, and alumina-boric oxide. All of these materials are well-known cracking catalysts. The catalyst may be in granular form or it may be in the form of beads or other molded material.

The cracking chamber 12 is maintained at the desired cracking temperature, such as from 800° F. to 1000° F., either by the superheat of the oil vapors introduced or by introducing the catalyst in highly heated state through conduit 17. As a further alternative, the reactor 12 may be fired or heat exchange tubes may be positioned in the reactor for supplying the required heat. The cracked vapors are removed overhead from the reactor 12 through one or more spaced conduits 21, 22 and 23 and may be passed to suitable fractionating equipment which, for purpose of simplicity, has been omitted from the drawings.

By selecting the point of entry of the oil vapors into the catalyst and the point of withdrawal of the cracked vapors therefrom, the length of path of the oil vapors through the catalyst may be readily controlled.

The conduit 19 employed for withdrawing the catalyst from the reactor may be provided with star feeders 24 and 25 arranged in spaced relationship. Steam may be introduced between the two star feeders through line 26 and withdrawn through line 27 for removing oil vapors absorbed or otherwise admixed with the catalyst being withdrawn. If desired, a further stripping agent, such as steam or the like, may be introduced above the star feeder 25 for removing oil vapors from the catalyst. The catalyst withdrawn through conduit 19 discharges into a hopper 28 and is picked up by a bucket conveyor 29 positioned within the housing 31 and is elevated to a point above regenerator 32. The catalyst discharges from the top of the bucket conveyor 29 through a conduit 33 into the top of the regenerator 32. The conduit 33 may be provided with a suitable control valve such as a star feeder 34 for preventing the regeneration gas from passing into the bucket conveyor housing.

The catalyst discharges downwardly through the conduit 33 into the regenerator 32 which is maintained substantially full of catalyst. Air for regeneration may be introduced into the bottom of the regenerator 32 through line 35 and the spent combustion gases may be withdrawn through line 36. Heat exchange tubes or other suitable means may be positioned within the regenerator for controlling the temperature and for avoiding deactivation of the catalyst therein. The regenerated catalyst is withdrawn from the bottom of regenerator 32 through a conduit 38 having a star feeder 39 or other suitable control means for regulating the flow of catalyst from the regenerator. The regenerated catalyst removed through conduit 38 discharges into a hopper 40 and is elevated by means of a bucket conveyor 41 positioned in housing 42 to the top of the reactor 12. The regenerated catalyst discharges from the top of the bucket conveyor through the conduit 17 back into the reactor.

Fig. 2 illustrates a modified type of reaction chamber. For simplicity, the regenerator and the conveying system for transporting the catalyst from the reactor to the regenerator and back to the reactor have been omitted. In the apparatus illustrated in Fig. 2, the conduit 17 for introducing catalyst into the reactor 12 is provided with an extensible tube 43 adapted to be raised and lowered within the reactor by means of a rod 44 extending through a stuffing box 45. Means such as a hydraulic piston 46 may be provided for raising and lowering the extensible conduit 43. The level of the catalyst within the reactor 12 may be controlled by raising and lowering the extensible conduit 43, thus varying the amount of catalyst contained in the reactor.

A similar extensible conduit 48 may be provided for introducing or removing the reactants from the reaction chamber 12. This extensible conduit may be controlled by means for a hydraulic piston 49 operating through a rod 51. In this modification the oil vapors to be cracked may be introduced through conduit 52 having extensible portion 48 telescoping therewith so that the oil vapors pass downwardly through the catalyst mass within the reaction chamber. When operating in this manner the reaction products are withdrawn from the bottom portion of the reaction chamber through a false perforated bottom 53 and line 54. The catalyst discharges from the bottom of the reaction chamber 12 through the conduit 19 as described in connection with Fig. 1. If desired, the oil vapors to be reacted may be passed into the bottom of the reactor shown in Fig. 2 and the reaction products withdrawn from the top. When providing an extensible conduit 48 for the reactant gases, the extensible conduit 43 for the catalyst may be omitted, if desired.

From the above description it will be apparent that in accordance with the present invention the amount of catalyst within the reactor may be controlled without destroying the seal at the catalyst inlet, or the length of path of the oil vapors through the catalyst may be regulated to give the required space velocity without varying or changing the flow rate of oil being processed.

Having described the preferred embodiment of the invention, it will be understood that it embraces such other variations and modifications as come within the spirit and scope thereof.

What is desired to be protected by Letters Patent is:

1. In a process of contacting hydrocarbons with solid catalytic material by continuously passing a stream of hydrocarbons through a moving bed of said catalyst, wherein active catalyst is continuously supplied to the top of said catalyst bed, spent catalyst is continuously withdrawn from the bottom of said catalyst bed, and the spent catalyst is regenerated and returned to the top of said catalyst bed, the improvements which comprise reducing the space velocity of the hydrocarbons through said catalyst bed by increasing the volume of the bed as the average activity of catalyst entering the catalyst bed diminishes, without interrupting the flow of hydrocarbons therethrough, while maintaining otherwise substantially uniform operation conditions throughout the process, thereby obtaining a substantially uniform rate of conversion and yield of products.

2. In a process of contacting hydrocarbons with solid catalytic material by continuously passing a stream of hydrocarbon vapors through a moving bed of said catalyst, wherein active catalyst is continuously supplied to the top of said catalyst bed, spent catalyst is continuously withdrawn from the bottom of said catalyst bed, and the spent catalyst is regenerated and returned to the top of said catalyst bed, the improvements which comprise initially establishing a minimum volume of catalyst bed which will give an optimum hydrocarbon space velocity for catalyst of maximum activity, thereafter reducing the space velocity in proportion to the progressively diminishing average activity of catalyst entering the catalyst bed by progressively increasing the volume of the bed, thereby obtaining optimum space velocities for catalyst of diminishing activity without interrupting the flow of hydrocarbon therethrough, while maintaining otherwise substantially uniform operating conditions throughout the process, thereby obtaining a substantially uniform rate of conversion and yield of products.

3. A continuous method for catalytically cracking petroleum hydrocarbons which comprises continuously passing hydrocarbon vapors upwardly through a reaction chamber containing a bed of solid catalyst, continuously withdrawing the vapor of the cracked hydrocarbons from the reaction chamber above the level of the catalyst bed, continuously withdrawing spent catalyst from the lower end of the catalyst bed, regenerating said spent catalyst, continuously adding said regenerated catalyst to the top of the catalyst bed, and gradually increasing the depth of the catalyst bed without interrupting the flow of the hydrocarbon vapor therethrough in proportion to the gradually diminishing activity of said regenerated catalyst so that the decreased activity of the catalyst will be offset by the increased amount of the catalyst which the incoming hydrocarbon vapors are forced to contact.

4. A continuous method for catalytically cracking petroleum hydrocarbons which comprises establishing a minimum solid catalyst bed in the reaction chamber which will give an optimum hydrocarbon space velocity for a catalyst of maximum activity, continuously passing hydrocarbon vapors upwardly through the said bed of catalyst, continuously withdrawing the vapor of the cracked hydrocarbons from the reaction chamber above the level of the catalyst bed, continuously withdrawing spent catalyst from the lower end of the catalyst bed, regenerating said spent catalyst, continuously adding said regenerated catalyst to the top of the catalyst bed, and gradually increasing the volume of the catalyst bed without interrupting the flow of the hydrocarbon vapors therethrough in proportion to the gradually diminishing activity of said regenerated catalyst so that the decreased activity of the catalyst will be offset by the increased amount of the catalyst which the incoming hydrocarbon vapors are forced to contact.

CHARLES E. HEMMINGER.

REFERENCES CITED

The following references are of record in the file of this patent:

UNITED STATES PATENTS

| Number | Name | Date |
|---|---|---|
| 669,411 | Guiterman | Mar. 5, 1901 |
| 909,690 | Schmidt | Jan. 12, 1909 |
| 1,382,746 | Schrader et al. | June 28, 1921 |
| 2,161,677 | Houdry | June 6, 1939 |
| 2,239,801 | Voorhees | Apr. 29, 1941 |
| 2,248,196 | Plummer | July 8, 1941 |
| 2,274,003 | Sheppard | Feb. 24, 1942 |
| 2,298,593 | Rubin et al. | Oct. 13, 1942 |
| 2,301,044 | Heard et al. | Nov. 3, 1942 |
| 2,330,069 | Marshall | Sept. 2, 1943 |
| 2,338,573 | Creelman | Jan. 4, 1944 |
| 2,353,505 | Scheineman | July 11, 1944 |
| 2,362,621 | Fahnestock | Nov. 14, 1944 |
| 2,390,031 | Schutte | Nov. 27, 1945 |
| 2,409,596 | Simpson et al. | Oct. 15, 1946 |
| 2,418,672 | Sinclair et al. | Apr. 8, 1947 |